Patented Oct. 28, 1947

2,429,719

UNITED STATES PATENT OFFICE 2,429,719

PRODUCTION OF UNSATURATED DIMERS OF ALPHA ALKYL STYRENES

Arthur B. Hersberger, Drexel Hill, and Randall G. Heiligmann, Yeadon, Pa., assignors to The Atlantic Refining Company, Philadelphia, Pa., a corporation of Pennsylvania No Drawing. Application January 18, 1946, Serial No. 642,100

10 Claims. (Cl. 260—669)

The present invention relates to the production of alpha alkyl styrene polymers, and more particularly to the preparation of unsaturated dimers from monomeric alpha alkyl styrenes such as alpha methyl styrene and alpha methyl para methyl styrene.

An object of this invention is the catalytic polymerization of an alpha alkyl styrene under conditions productive of a high yield of unsaturated dimer substantially free of cyclic saturated dimer.

The process of the present invention is applicable to alpha alkyl styrenes having the formula

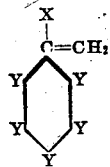

wherein X may be an alkyl group such as methyl, ethyl, propyl, or isopropyl, but is preferably methyl, and Y may be hydrogen or alkyl, cycloalkyl, aryl, substituted aryl, or cycloalkenyl group, but is preferably hydrogen or methyl, ethyl, propyl, or isopropyl.

We have found that substantial yields of unsaturated dimers relatively free of cyclic saturated dimers may be obtained by treating a monomeric alpha alkyl styrene, such as alpha methyl styrene, with a catalyst comprising sulfuric acid of certain concentrations under controlled temperature conditions. More specifically, we have found that the unsaturated dimers, substantially free of cyclic saturated dimers, may be produced by intimately contacting an alpha alkyl styrene with sulfuric acid of 30% to 65% concentration at temperatures between 150° F. and 220° F., and preferably between 170° F. and 200° F. We have further found that similar results may be obtained using sulfuric acid of 50% to 65% concentration at temperatures between 60° F. and 220° F., and preferably between 70° F. and 80° F. The use of sulfuric acid of concentrations below about 50% at temperatures below about 150° F. gives relatively poor yields of unsaturated dimer, while the use of sulfuric acid of concentrations above about 65% at ordinary temperatures (60° F.–100° F.) gives substantial conversion to undesirable cyclic saturated dimers, and at elevated temperatures (150° F. to 220° F.) gives almost complete conversion to the saturated dimer. The presence of the cyclic saturated dimer as a contaminant in the unsaturated dimer is undesirable in many instances, and once formed is very difficult if not impossible to remove since its boiling point is very close to that of the unsaturated dimer. It is therefore an object of this invention to produce the unsaturated dimer to the substantial exclusion of the cyclic saturated compound.

In carrying out our process, the alpha alkyl styrene is introduced into a suitable vessel provided with means for controlling the temperature, such as a jacket or internal tubes for circulating a heat exchange medium, and the required quantity of sulfuric acid of proper concentration is added, the entire mixture being thoroughly agitated by mechanical or other means during the ensuing polymerization reaction. The quantity of acid used may range from 0.5 to 5 volumes per volume of monomeric alpha alkyl styrene, and in general a ratio of 3 to 1 or 4 to 1 is satisfactory. The conversion time required is dependent to some extent upon the quantity and concentration of the sulfuric acid catalyst, as well as upon the temperature of reaction. Efficient conversions have been obtained in from 2 to 8 hours, although shorter or longer periods may be required in some cases. When sulfuric acid of 50% to 65% concentration is used, the reaction temperature may range from 60° F. to 220° F., and with acid concentrations of 30% to 65%, a temperature of 150° F. to 220° F. may be used. Low concentrations of acids, i. e., 30%–40%, for example, are not particularly effective at temperatures below about 150° F. Upon completion of the treatment of the monomeric alpha alkyl styrene with the sulfuric acid catalyst to effect conversion thereof to the unsaturated dimer relatively free of cyclic saturated dimer, the reaction mixture is permitted to settle and stratify, the lower layer of sulfuric acid thereafter being separated from the upper hydrocarbon layer. The upper layer may be neutralized with a solution of a base, if necessary, or may be simply water washed to remove traces of entrained acid. Such upper layer may then be fractionally distilled, preferably under reduced pressure, to separate unconverted monomer, unsaturated dimer, and small amounts of higher polymers which may be formed as by products. Careful control of the polymerization conditions minimizes the formation of these higher polymers, and since the boiling point thereof is substantially higher than that of the desired unsaturated dimer, such higher polymers are amenable to separation by fractionation. If desired, the conversion reaction may be carried out continuously by passing the monomeric alpha alkyl styrene, in a fine state of dispersion, countercurrent to a stream of the acid catalyst, provision being made to separate and recycle any unconverted monomeric alkyl styrene for further treatment. Catalyst activators such as metal salts, for example, mercuric sulfate, may be incorporated in small amounts in the sulfuric acid to enhance the activity thereof.

Our invention may be further illustrated by the following examples, which, however, are not to be construed as limiting the scope thereof.

Monomeric alpha methyl styrene was intimately contacted with various concentrations of sulfuric acid at different temperatures, and the reaction mixture was then separated, the sulfuric acid being discarded and the hydrocarbon mixture being separated into components by fractional distillation at reduced pressure. Examples are also included showing the results of treatment with sulfuric acid of concentrations higher than those within the scope of the present invention.

| Sulfuric Acid | | Reaction | | Per Cent Unconverted | Per Cent Unsat. dimer | Per Cent Sat. dimer |
|---|---|---|---|---|---|---|
| Concentration | Quantity | Temp., °F. | Time, hrs. | | | |
| Per cent | Per cent | | | | | |
| 30 | 400 | 170–190 | 4 | 60 | 40 | 0 |
| 40 | 400 | 170–190 | 4 | 57 | 43 | 0 |
| 50 | 400 | 122–180 | 6 | 0 | 99 | 1 |
| 60 | 400 | 122–180 | 6 | 0 | 98 | 2 |
| 60 | 3 | 150–180 | 6 | 88 | 12 | 0 |
| 60 | 6 | 150–180 | 6 | 80 | 20 | 0 |
| 60 | 100 | 150–180 | 6 | 23 | 75 | 2 |
| 70 | 400 | 180–190 | 6 | 0 | 10 | 90 |
| 50 | 400 | 70–80 | 8 | 80 | 20 | 0 |
| 60 | 400 | 70–80 | 8 | 0 | 100 | 0 |
| 70 | 400 | 75–100 | 8 | 0 | 90 | 10 |
| 80 | 400 | 75–100 | 5 | 0 | 0 | 100 |

In the above examples, the determination of the quantities of the unsaturated dimer and the cyclic saturated dimer were made by means of the refractive index and bromine number. The unsaturated dimer had a boiling point of 243° F.–248° F. at 0.1 mm. pressure, a refractive index of 1.5677 at 20° C., and a bromine number of 67. The cyclic saturated dimer had a boiling point of 244° F.–248° F., a refractive index of 1.5633 at 20° C., a bromine number of 0, and a melting point of 126° F.–129° F.

From the above examples it is evident that the use of sulfuric acid catalyst in concentrations of 70% or higher produced undesirably large quantities of the cyclic saturated dimer. It is therefore an object of this invention to utilize sulfuric acid catalysts having a concentration below that at which substantial amounts of the cyclic saturated dimer are produced, i. e., concentrations not greater than about 65%, whereby there may be produced an unsaturated dimer having a low content of saturated dimer.

While the present invention has been described particularly with reference to the dimerization of the alpha methyl styrene, such invention is equally well adapted in the polymerization of other alpha alkyl styrenes or mixtures thereof, including but not limited to alpha methyl para methyl styrene, alpha methyl para ethyl styrene, alpha methyl para propyl styrene, alpha methyl para isopropyl styrene, alpha methyl meta methyl styrene, alpha ethyl styrene, alpha ethyl para ethyl styrene, alpha propyl styrene, alpha propyl para propyl styrene, and the like.

We claim:

1. A process for producing the unsaturated dimer of an alpha alkyl styrene, which comprises intimately contacting said alpha alkyl styrene with sulfuric acid of 30% to 65% concentration at a temperature between 150° F. and 220° F., and separating the resulting unsaturated dimer from the sulfuric acid.

2. A process for producing the unsaturated dimer of an alpha alkyl styrene, which comprises intimately contacting said alpha alkyl styrene with from 0.5 to 5 volumes of sulfuric acid of 30% to 65% concentration at a temperature between 150° F. and 220° F., and separating the resulting unsaturated dimer from the sulfuric acid.

3. A process for producing the unsaturated dimer of an alpha alkyl styrene, which comprises intimately contacting said alpha alkyl styrene with sulfuric acid of 50% to 65% concentration at a temperature between 60° F. and 220° F., and separating the resulting unsaturated dimer from the sulfuric acid.

4. A process for producing the unsaturated dimer of an alpha alkyl styrene, which comprises intimately contacting said alpha alkyl styrene with from 0.5 to 5 volumes of sulfuric acid of 50% to 65% concentration at a temperature between 60° F. and 220° F., and separating the resulting unsaturated dimer from the sulfuric acid.

5. A process for producing the unsaturated dimer of alpha methyl styrene, which comprises intimately contacting said alpha methyl styrene with sulfuric acid of 30% to 65% concentration at a temperature between 150° F. and 220° F., and separating the resulting unsaturated dimer from the sulfuric acid.

6. A process for producing the unsaturated dimer of alpha methyl styrene, which comprises intimately contacting said alpha methyl styrene with from 0.5 to 5 volumes of sulfuric acid of 30% to 65% concentration at a temperature between 150° F. and 220° F., and separating the resulting unsaturated dimer from the sulfuric acid.

7. A process for producing the unsaturated dimer of alpha methyl styrene, which comprises intimately contacting said alpha methyl styrene with sulfuric acid of 50% to 65% concentration at a temperature between 60° F. and 220° F., and separating the resulting unsaturated dimer from the sulfuric acid.

8. A process for producing the unsaturated dimer of alpha methyl styrene, which comprises intimately contacting said alpha methyl styrene with from 0.5 to 5 volumes of sulfuric acid of 50% to 65% concentration at a temperature between 60° F. and 220° F., and separating the resulting unsaturated dimer from the sulfuric acid.

9. A process for producing the unsaturated dimer of alpha methyl styrene, which comprises intimately contacting said alpha methyl styrene with about 4 volumes sulfuric acid of 30% to 65% concentration at a temperature between 170° F. and 200° F., and separating the resulting unsaturated dimer from the sulfuric acid.

10. A process for producing the unsaturated dimer of alpha methyl styrene, which comprises intimately contacting said alpha methyl styrene with about 4 volumes of sulfuric acid of 50% to 65% concentration at a temperature between 70° F. and 80° F., and separating the resulting unsaturated dimer from the sulfuric acid.

ARTHUR B. HERSBERGER.
RANDALL G. HEILIGMANN.

(References on following page)

REFERENCES CITED

The following references are of record in the file of this patent:

UNITED STATES PATENTS

| Number | Name | Date |
| --- | --- | --- |
| 2,215,569 | Stanley et al. | Sept. 24, 1940 |

OTHER REFERENCES

Tiffeneau, Ann. Chim. (8), 10, 157 (1907), Patent Office Library.

Stanley, Journal Soc. Chem. Ind., vol. 17, 1080-3 (1939), Patent Office Library.